United States Patent
Jeon et al.

(10) Patent No.: US 9,643,511 B2
(45) Date of Patent: May 9, 2017

(54) METHOD AND APPARATUS FOR ESTIMATING STATE OF CHARGE (SOC) OF BATTERY IN ELECTRIC VEHICLE

(71) Applicants: Samsung Electronics Co., Ltd., Suwon-si (KR); North Carolina State University, Raleigh, NC (US)

(72) Inventors: Paul Barom Jeon, Seoul (KR); Mo-Yuen Chow, Raleigh, NC (US); Taejung Yeo, Yongin-si (KR); Habiballah Rahimi Eichi, Raleigh, NC (US)

(73) Assignees: Samsung Electronics Co., Ltd., Suwon-si (KR); North Carolina State University, Raleigh, NC (US)

( * ) Notice: Subject to any disclaimer, the term of this patent is extended or adjusted under 35 U.S.C. 154(b) by 0 days.

(21) Appl. No.: 14/925,710

(22) Filed: Oct. 28, 2015

(65) Prior Publication Data

US 2016/0176309 A1    Jun. 23, 2016

Related U.S. Application Data

(60) Provisional application No. 62/093,087, filed on Dec. 17, 2014.

(30) Foreign Application Priority Data

Dec. 29, 2014 (KR) .......................... 10-2014-0191804
Jun. 16, 2015 (KR) .......................... 10-2015-0085366

(51) Int. Cl.
*G06F 17/00* (2006.01)
*B60L 11/18* (2006.01)
*G01C 21/34* (2006.01)

(52) U.S. Cl.
CPC ...... *B60L 11/1861* (2013.01); *G01C 21/3469* (2013.01)

(58) Field of Classification Search
CPC ............. B60R 21/013; B60R 21/0173; B60W 30/095; B60W 50/14; G06F 17/30241; G06F 7/00
(Continued)

(56) References Cited

U.S. PATENT DOCUMENTS 6,480,783 B1 * 11/2002 Myr .................. G01C 21/3492
                                                     340/990
8,433,455 B2    4/2013 Siy et al.
(Continued)

FOREIGN PATENT DOCUMENTS

JP    2013-2873 A    1/2013
JP    2014-107927 A    6/2014
(Continued)

OTHER PUBLICATIONS

T-K, Lee, et al., "Synthesis of Real-World Driving Cycles and Their Use for Estimating PHEV Energy Consumption and Charging Opportunities: Case Study for Midwest/U.S.," IEEE Transactions on Vehicular Technology, vol. 60, No. 9, Nov. 2011, pp. 4153-4163.
(Continued)

*Primary Examiner* — McDieunel Marc
(74) *Attorney, Agent, or Firm* — NSIP Law

(57) ABSTRACT

An apparatus for estimating a state of charge (SOC) of a battery in an electric vehicle is provided. The apparatus may include a driving history data storage configured to store driving history data for each category among categories generated based on a frequency of appearance of road data, a driving profile generator configured to categorize road data associated with a driving route for each of the generated categories and generate a driving profile with respect to the
(Continued)

driving route based on the driving history data corresponding to the categorized road data, and a battery SOC estimator configured to estimate the SOC of a the battery with respect to the driving route based on the driving profile.

23 Claims, 9 Drawing Sheets

(58) Field of Classification Search
USPC ............... 701/22, 36, 45; 707/737; 180/271; 340/905
See application file for complete search history.

(56) References Cited

U.S. PATENT DOCUMENTS

| | | | | |
|---|---|---|---|---|
| 2007/0225882 | A1* | 9/2007 | Yamaguchi | B60W 50/14 |
| | | | | 701/36 |
| 2012/0011122 | A1* | 1/2012 | Sakuma | G06F 17/30241 |
| | | | | 707/737 |
| 2013/0015814 | A1 | 1/2013 | Kelty et al. | |
| 2015/0091507 | A1* | 4/2015 | Hyde | B60L 11/1824 |
| | | | | 320/108 |
| 2015/0091531 | A1* | 4/2015 | Hyde | B60L 11/1824 |
| | | | | 320/137 |
| 2015/0147614 | A1* | 5/2015 | Wang | G01R 31/3624 |
| | | | | 429/93 |

FOREIGN PATENT DOCUMENTS

| | | |
|---|---|---|
| JP | 2014-151798 A | 8/2014 |
| KR | 10-1231515 B1 | 2/2013 |
| KR | 10-1241783 B1 | 3/2013 |
| KR | 10-1369261 B1 | 3/2014 |

OTHER PUBLICATIONS

H. Rahimi-Eichi, et al., "Battery Management System," IEEE Industrial Electronics Magazine, Jun. 2014, pp. 4-16.

H. Rahimi-Eichi, et al., "Online Adaptive Parameter Identification and State-of-Charge Coestimation for Lithium-Polymer Battery Cells," IEEE Transactions on Industrial Electronics, vol. 61, No. 4, Apr. 2014, pp. 2053-2061.

H. Rahimi-Eichi, et al., "Big-Data Framework for Electric Vehicle Range Estimation," Proceedings from the 40$^{th}$ Annual Conference of the IEEE Industrial Electronics Society (IECON 2014), Nov. 2014, pp. 1-7.

* cited by examiner

METHOD AND APPARATUS FOR ESTIMATING STATE OF CHARGE (SOC) OF BATTERY IN ELECTRIC VEHICLE

CROSS-REFERENCE TO RELATED APPLICATION(S)

This application claims the benefit under 35 U.S.C. §119(e) of U.S. Provisional Application No. 62/093,087 filed on Dec. 17, 2014, in the U.S. Patent and Trademark Office, and claims the benefit under 35 U.S.C. §119(a) of Korean Patent Application No. 10-2014-0191804 filed on Dec. 29, 2014, in the Korean Intellectual Property Office, and Korean Patent Application No. 10-2015-0085366 filed on Jun. 16, 2015, in the Korean Intellectual Property Office, the entire disclosures of which are incorporated herein by reference for all purposes.

BACKGROUND

1. Field

The following description relates to a method and apparatus for estimating a state of charge (SOC) of a battery by analyzing driving history data of a driver and generating a driving profile to estimate a driving range of a vehicle.

2. Description of Related Art

In relation to environmental issues and energy resource issues, electric vehicles are emerging as future forms of transportation.

Technology that quickly recharges an electric vehicle during driving is yet to be developed. Thus, measurement of a driving range before driving may be required to determine whether remaining battery power is sufficient to drive to a desired destination.

A speed and acceleration during driving may represent a driving behavior of a driver and, thus, may be used as significant parameters in estimation of a driving range of an electric vehicle. Also, the speed and acceleration during driving may be determined based on the driving behavior of the driver and characteristics of a road on which the driver drives to a destination. In this example, the driver may drive at different speeds and different accelerations in various areas. Accordingly, a driving profile may be generated in consideration of a driving behavior of a driver based on a corresponding road environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for estimating a state of charge (SOC) of a battery in an electric vehicle includes a driving history data storage configured to store driving history data for each category among categories generated based on a frequency of appearance of road data, a driving profile generator configured to categorize road data associated with a driving route for each of the generated categories and generate a driving profile with respect to the driving route based on the driving history data corresponding to the categorized road data, and a battery SOC estimator configured to estimate the SOC of the battery with respect to the driving route based on the driving profile.

The driving history data storage may be configured to store a speed and acceleration profile of the road data corresponding to each of the generated categories.

The driving history data storage may be configured to determine whether the road data belongs to a pre-existing defined category among the generated categories, and the road data may be classified into the pre-existing defined category in response to the road data belonging to the pre-existing category, and the road data may be classified into an undefined category in response to the road data not belonging to the pre-existing defined category.

The driving history data storage may include a category generator configured to generate a new defined category corresponding to predetermined road data in response to an iteration count of the predetermined road data classified into the undefined category being equal to a predetermined threshold value.

The predetermined threshold value may be a road data iteration count of a category having a minimum road data iteration count, among pre-existing categories.

The driving history data storage may be configured to generate statistical information of the driving history data, calculate a transition probability matrix of the driving history data, and generate statistical criteria of the driving history data.

The driving profile generator may be configured to generate the driving profile using at least one of a speed profile generated based on the driving history data stored in a driving history data storage, a weather profile generated based on information received from a weather information website, and a road profile generated based on information received from a map service database.

The driving profile generator may include a receiver configured to receive route data corresponding to the driving route from a map service database, an extractor configured to extract road data from the route data, and a categorizer configured to categorize the road data for each of the generated categories.

The receiver may be configured to store the route data in an extensible markup language (XML) format, and the extractor may be configured to extract the road data from a summary field of the route data.

The driving profile generator may be configured to generate the driving profile by applying the transition probability matrix to the driving history data corresponding to the categorized road data.

The driving profile generator may include a verification module configured to verify whether the driving profile satisfies statistical criteria of the driving history data.

The statistical criteria may include at least one of an average speed, an average acceleration, a standard deviation of speed, a standard deviation of acceleration, a mean positive acceleration, and a mean positive speed.

In another general aspect, there is provided method of estimating an SOC of a battery in an electric vehicle. The method includes: storing, in a driving history data storage, driving history data for each category generated based on a frequency of appearance of road data; categorizing, using a driving profile generator, road data associated with a driving route for each of the generated categories and generating a driving profile with respect to the driving route based on the driving history data corresponding to the categorized road data; and estimating, using a battery SOC estimator, the SOC of the battery with respect to the driving route based on the driving profile.

The storing may include storing a speed and acceleration profile of the road data corresponding to each of the generated categories.

The storing may include determining whether the road data belongs to a pre-existing defined category among the generated categories, classifying the road data into the pre-existing defined category in response to the road data belonging to the pre-existing defined category, and classifying the road data into an undefined category in response to the road data not belonging to the pre-existing defined category.

The classifying of the road data into the undefined category may include generating a new category corresponding to predetermined road data in response to an iteration count of the predetermined road data classified into the undefined category being equal to a predetermined threshold value.

The storing may include generating statistical information of the driving history data, calculating a transition probability matrix of the driving history data, and generating statistical criteria of the driving history data.

The categorizing may include generating the driving profile using at least one of a speed and acceleration profile generated based on the driving history data stored in a driving history data storage, a weather profile generated based on information received from a weather information website, and a road profile generated based on information received from a map service database.

The categorizing may include receiving route data corresponding to the driving route from a map service database, extracting road data from the route data, and categorizing the road data for each of the generated categories.

The categorizing may include generating the driving profile by applying the transition probability matrix to the driving history data corresponding to the categorized road data.

The categorizing may include verifying whether the driving profile satisfies statistical criteria of the driving history data.

In yet another general aspect, an apparatus for estimating a state of charge (SOC) of a battery in an electric vehicle includes: a storage configured to store driving history for each category among categories generated based on road data; and a processor configured to categorize road data associated with a driving route for each of the generated categories, generate a driving profile with respect to the driving route based on the driving history data corresponding to the categorized road data, and estimate the SOC of the battery with respect to the driving route based on the driving profile.

The driving profile may include a speed and acceleration profile.

The generated categories may be generated based on a frequency of appearance of road data.

Other features and aspects will be apparent from the following detailed description, the drawings, and the claims.

Figure 1:
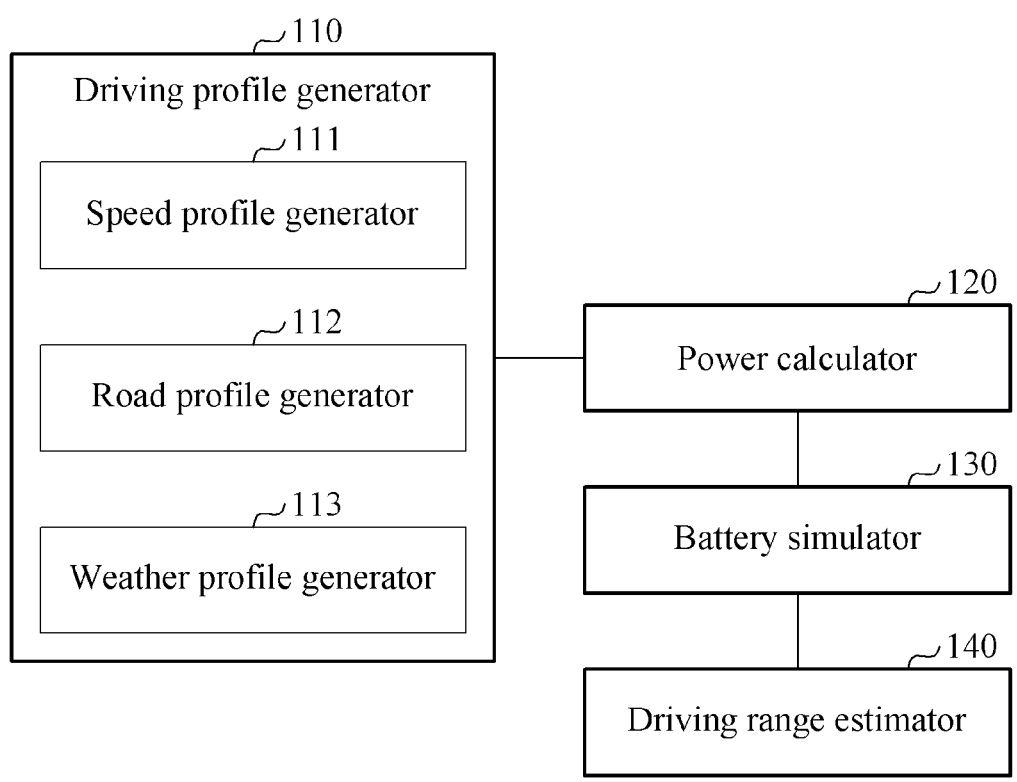
FIG. 1 is a block diagram illustrating an example of an apparatus for estimating a driving range of an electric vehicle.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram illustrating an example of an apparatus for estimating a driving range of an electric vehicle.

Referring to FIG. 1, an apparatus 100 for estimating a driving range of an electric vehicle includes a driving profile generator 110, a power calculator 120, a battery simulator 130, and a driving range estimator 140.

The driving profile generator 110 includes a speed profile generator 111, a road profile generator 112, and a weather profile generator 113.

The driving profile described herein indicates a driving pattern expected with respect to a driving route to be taken by a driver. Thus, the driving profile generator 110 generates the driving profile by predicting the driving pattern of the driver with respect to the driving route.

The speed profile generator 111 generates a speed and acceleration profile for a driving route to a desired destination based on the driving history data of the driver. The speed and acceleration profile may include an expected speed and an expected acceleration on the driving route.

In an example, the speed profile generator 111 generates a speed and acceleration profile for the driver on a corresponding route based on speed and acceleration information calculated based on the driving history data of the driver.

The road profile generator 112 generates a road profile for the driving route to the desired destination using a route data received from a map service application. The road profile may include a condition and a slope of the driving route. The map service application may include at least one of a web mapping service application (e.g., Google Maps or MapQuest), and an on-board navigation service application (e.g., TomTom or Garmin).

The weather profile generator 113 generates a weather profile using weather information with respect to the driving route. The weather information may be received, for example, through a weather forecasting website. The weather profile may include an expected weather of the driving route.

The power calculator 120 calculates an amount of power required to drive to the desired destination by integrating information collected by the speed profile generator 111, the road profile generator 112, and the weather profile generator 113.

The battery simulator 130 verifies whether a battery in the electric vehicle is capable of supplying the required power.

The driving range estimator 140 estimates whether the electric vehicle is capable of travelling to the desired destination based on a state of charge (SOC) of the battery.

Figure 2:
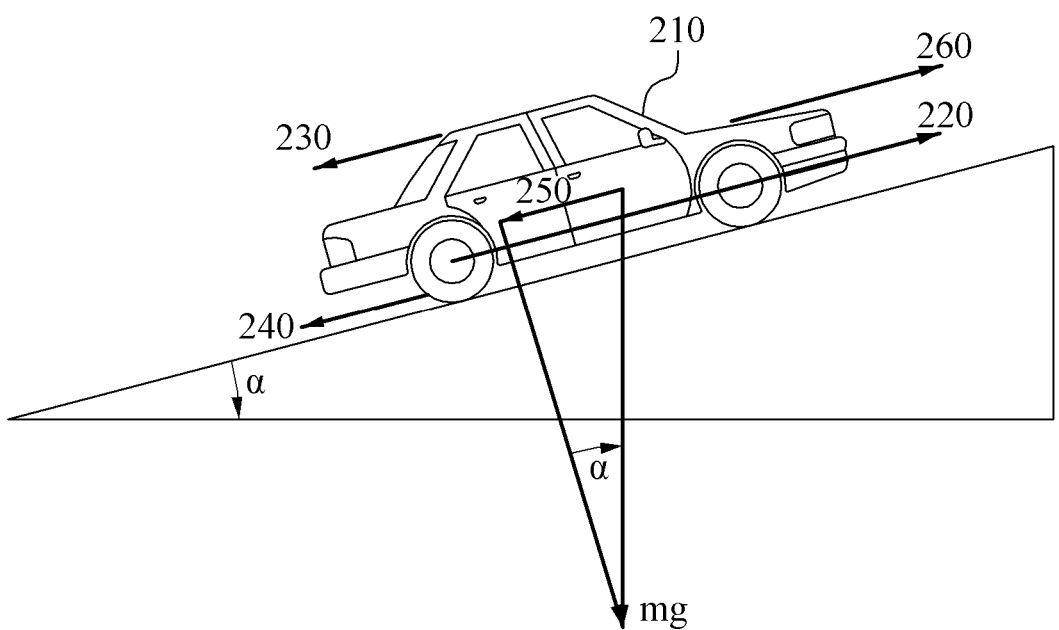
FIG. 2 is a free body diagram illustrating an example of an electric vehicle.

FIG. 2 is a free body diagram illustrating an example of an electric vehicle. A parameter required to calculate an amount of power in a battery is represented with reference to FIG. 2.

Referring to FIG. 2, a traction $F_{Traction}$ 220 for moving a vehicle 210 may be a scalar sum of an air resistance $F_{aero}$ 230, a tire friction $F_{Tire}$ 240, a gravity $F_{grav}$ 250, and an acceleration $F_{accel}$ 260. Thus, the traction $F_{Traction}$ 220 is expressed as shown in Equation 1.

$$F_{Traction} = F_{Tire} + F_{aero} + F_{grav} + F_{accel} \quad \text{[Equation 1]}$$

The tire friction $F_{Tire}$ 240 is expressed as shown in Equation 2.

$$F_{Tire} C_{rr} mg \cos(\alpha) \quad \text{[Equation 2]}$$

In Equation 2, $C_{rr}$ denotes a frictional coefficient, m denotes a mass of the vehicle 210, and g denotes a gravitational acceleration.

The gravity $F_{grav}$ 250 is expressed as shown in Equation 3.

$$F_{grav} = mg \sin(\alpha) \quad \text{[Equation 3]}$$

In Equation 3, m denotes a mass of the vehicle 210 and g denotes a gravitational acceleration.

The air resistance $F_{aero}$ 230 is expressed as shown in Equation 4.

$$F_{aero} = \tfrac{1}{2} \rho A C_d (v - v_w)^2 \quad \text{[Equation 4]}$$

In Equation 4, $\rho$ denotes an air density, A denotes a front area of the vehicle 210, $C_d$ denotes a drag coefficient, v denotes a velocity of the vehicle 210, and $v_w$ denotes a velocity of wind blowing in an opposite direction.

The acceleration $F_{accel}$ 260 is expressed as shown in Equation 5.

$$F_{accel} = \left(m + I \frac{G^2}{\eta_g r^2}\right) a \quad \text{[Equation 5]}$$

In Equation 5, m denotes a mass of the vehicle 210, I denotes a moment of inertia of a rotor of the vehicle 20, $\eta_g$ denotes a gear system efficiency of the vehicle 210, r denotes a radius of a wheel of the vehicle 210, and G denotes a gear ratio of the vehicle 210.

A power for traction $P_{Traction}$ is expressed as shown in Equation 6.

$$P_{Traction} = \frac{F_{Traction} \times v}{\eta_g} \quad \text{[Equation 6]}$$

In Equation 6, $\eta_g$ denotes a gear system efficiency of the vehicle 210 and v denotes a velocity of the vehicle 210.

A power of a vehicle motor $P_{motor}$ is expressed as shown in Equation 7.

$$P_{motor} = \frac{P_{Traction}}{\eta_m} \quad \text{[Equation 7]}$$

In Equation 7, $\eta_m$ denotes an efficiency of the vehicle motor.

A power of a vehicle battery $P_{battery}$ that drives the motor and ancillary devices of the vehicle is expressed as shown in Equation 8.

$$P_{bat} P_{battery} = P_{motor} + P_{Anc} \quad \text{[Equation 8]}$$

Based on Equation 8, the power of the vehicle battery $P_{bat}$ may be a sum of the power of the vehicle motor $P_{motor}$ and an ancillary power $P_{Anc}$ used in, for example, an air conditioner, a stereo system, and other electric devices included in the vehicle 210.

By substituting Equations 1 through 7 into Equation 8, the power of the vehicle battery $P_{bat}$ is expressed as shown in Equation 9.

$$P_{bat} = \frac{v}{\eta_m \eta_g} \times \left( mg \sin(\alpha) + C_{rr} mg \cos(\alpha) + \frac{1}{2} \rho A C_d (v - v_w)^2 + \left(m + I \frac{G^2}{\eta_g r^2}\right) a \right) + P_{Anc} \quad \text{[Equation 9]}$$

In Equation 9, data associated with the electric vehicle may be used as standard information to be obtained from an electric vehicle manufacturer. Also, parameters related to a battery model may be obtained by applying an equivalent circuit model for an internal resistance of the vehicle battery. Also, the ancillary power $P_{Anc}$ may not be changed in various driving situations. Thus, variables affecting the power of the battery in the electric vehicle may be, for example, the speed and the acceleration of the vehicle, a wind speed, and a road grade. Accordingly, an amount of power of the battery in the electric vehicle $E_{bat}$ is expressed as shown in Equation 10.

$$E_{bat} = \int_{x_{start}}^{x_{end}} P_{bat} dt = (v, a, v_w, \alpha) \quad \text{[Equation 10]}$$

In Equation 10, the power of the vehicle battery is expressed as a function related to the speed of the vehicle, the acceleration of the vehicle, the wind speed, and the road grade by integrating the power of the vehicle battery to a travelling time from an origin to a destination. Thus, weather information, the road grade, the speed and the acceleration of the vehicle may be used as significant factors for estimating the SOC of the battery during a travelling of the vehicle.

Figure 3:
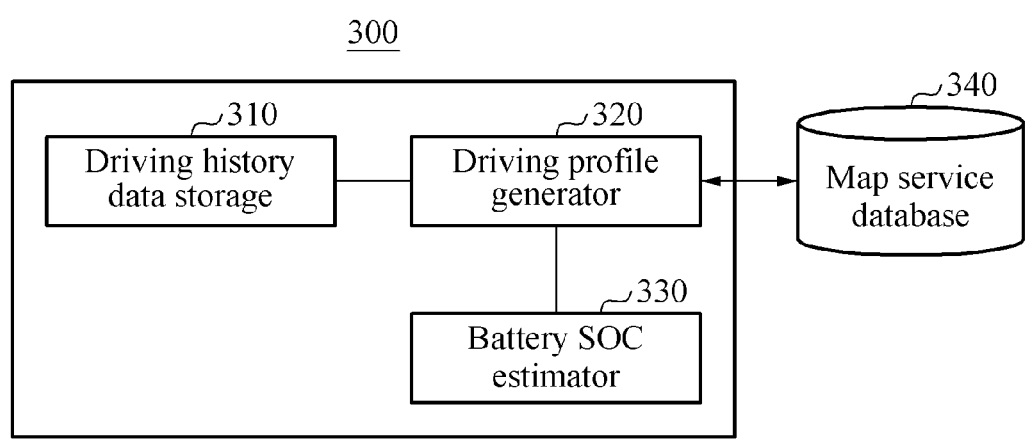
FIG. 3 is a diagram illustrating an example of an example of an apparatus for estimating a state of charge (SOC) of a battery in an electric vehicle.

FIG. 3 is a block diagram illustrating an example of an apparatus for estimating an SOC of a battery in an electric vehicle.

Referring to FIG. 3, an apparatus 300 for estimating an SOC of a battery in an electric vehicle includes a driving history data storage 310, a driving profile generator 320, and a battery SOC estimator 330. The apparatus 300 may further include a map service database 340. Alternatively, the apparatus 300 may receive route information from an external map service application. In this example, the driving profile generator 320 receives route data from the map service database 340.

Since each driver an electric vehicle may have a different driving pattern, a distance estimation result may include a relatively large difference when a speed and acceleration profile is generated based on an average speed and an average acceleration. Thus, driving history data of a driver may be collected and stored to generate an accurate speed and acceleration profile of the driver.

Currently existing technology for estimating a driving range of an electric vehicle relies on limited data collection. A speed and an acceleration representing a driving behavior of a driver during a driving may be significant parameters in estimation of a driving range of an electric vehicle. Also, the speed and the acceleration at which the vehicle is driven are closely related to a type of a route taken by the driver. A driver may drive at different speeds and different accelerations on various roads. When speed and acceleration data associated with driving on different roads are mixed, prediction of a future speed may be inaccurate. Thus, classification of a route to generate the driving profile may be a significant factor to increase an accuracy of a corresponding result. An apparatus for estimating an SOC of a battery in an electric vehicle may improve accuracy on a predictive range estimation algorithm.

The driving history data storage 310 stores driving history data of a driver for each category generated based on a frequency of appearance of road data (data related to characteristics of a road). In response to the driving history data being stored by the driving history data storage 310, the driving profile generator 320 reads, from the driving history data storage 310, information on a speed and an acceleration of the vehicle corresponding to a predetermined road.

The driving history data storage 310 may be included in the electric vehicle. Additionally, or alternatively, the driving history data storage 310 may be included in a portable device or user terminal such that the driver may carry the driving history data storage 310 separately from the electric vehicle. In an example, new driving data may be stored in a memory included in a user terminal of the driver every time that the vehicle is driven by the driver. In another example, new driving data may be stored in a memory of the electric vehicle and associated with a driver by designating the driver in the memory of the electric vehicle.

The driving history data storage 310 stores a speed and acceleration profile of road data corresponding to a category.

While driving the electric vehicle, the driver may receive road data which the driver drives on using at least one of a navigation service application and a map service application in real time. The map service application may include a web mapping service application, for example, Google Maps or MapQuest. Also, the map service application may include at least one on-board navigation service application, for example, TomTom or Garmin.

In an example, the driving history data storage 310 stores a speed and an acceleration of the vehicle based on the road data. In another example, the driving history data storage 310 stores a speed and an acceleration of the vehicle based on a category of the road data.

In this example, the category of the road data is determined based on the frequency of appearance of the road data. For example, the driving history data storage 310 determines whether the road data which the driver drives on belongs to a pre-existing defined category. When the road data is included in the pre-existing defined category, the road data is classified into a corresponding pre-existing defined category. When the road data is not included in the pre-existing defined category, the road data is classified into an undefined "others" category. In this disclosure, a "defined" category may be a category that is associated with a particular road, and the "undefined" category may be a category that is not associated with a particular road.

The driving history data storage 310 stores speed information and acceleration information of the vehicle for each of the categories classified based on the road data. When the road data corresponding to a road taken by the driver is included in the pre-existing defined category, the speed information and the acceleration information of the vehicle may be stored in the corresponding pre-existing defined category.

In this example, when the road data stored in the others category increases, overlapping road data may also increase. Thus, to reduce the road data stored in the others category, the driving history data storage 310 generates a new defined category corresponding to road data of which the frequency of appearance increases, thereby enhancing accuracy in the battery SOC estimation.

The driving history data storage 310 includes a category generator configured to generate a new defined category corresponding to predetermined road data classified as belonging to the others category, in response to an iteration count of the predetermined road data being equal to a predetermined threshold value. For example, when the driver drives on a US-101 road on which categorization is not performed for a first time, the driving history data storage 310 may store speed information and acceleration information of the vehicle in the others category. In this example, when the user repetitively drives on the US-101 road and the iteration count is equal to the predetermined threshold value, the driving history data storage 310 generates a new defined category for the US-101 road.

In an example, the predetermined threshold value indicates a road data iteration count of a category having a minimum road data iteration count, among pre-existing categories. For example, when the iteration count of the new road data corresponds to the number of road data iterations in the category having the minimum road data iteration count among pre-existing defined categories, the driving history data storage 310 generates the new defined category.

The driving history data storage 310 generates statistical information of the driving history data, and calculates a transition probability matrix of the driving history data.

In this example, the transition probability matrix may be, for example, a matrix representing a relationship between a speed and acceleration of the electric vehicle during a previous stage in a route and a speed and acceleration of the electric vehicle during a subsequent stage in a route. Thus, by analyzing the driving history data, the transition probability matrix between the previous stage and the subsequent stage in a predetermined route may be calculated based on characteristics of the driver.

The driving history data storage 310 generates statistical criteria of the driving history data. The statistical criteria includes at least one of an average speed, an average acceleration, a standard deviation of speed, a standard deviation of acceleration, a mean positive acceleration, and a mean positive speed.

The driving profile generator 320 receives route data for travel to a desired destination from the map service database 340 in order to generate a driving profile for the route data. In this example, the driving profile generator 320 generates the driving profile to be suitable for the characteristics of the driver based on the driving history data.

The driving profile generator 320 extracts road data from the received route data and categorizes the road data for each of the categories generated in the driving history data storage 310, thereby generating the driving profile for the driving route based on the driving history data corresponding to the categorized road data. In this example, the driving profile includes at least one of a speed and acceleration profile, a weather profile, and a road profile.

In an example, the speed and acceleration profile is generated based on the driving history data stored in the driving history data storage 310. The weather profile is generated based on information received from a weather information website. The road profile is generated based on information received from the map service database 340.

The driving profile generator 320 includes a receiver configured to receive route data corresponding to the driving route from the map service database 340, an extractor configured to extract road data from the route data, and a categorizer configured to categorize the road data for each of the generated categories. Related descriptions will be provided in detail with reference to FIG. 4.

In an example, the driving profile generator 320 generates a driving profile for travel to the desired destination by receiving information generated in the driving history data storage 310. The driving profile generator 320 generates the driving profile by applying the transition probability matrix to the driving history data corresponding to the categorized road data.

In an example, the driving profile generator 320 may form the speed and acceleration profile of the driver using a Markov chain scheme. The Markov chain scheme may be performed by determining data in a subsequent stage of a route based on data in a previous stage of the route. Thus, the driving profile generator 320 may determine to switch from a speed and acceleration on a previous stage of a route to a speed and acceleration on a subsequent stage of the route by using the transition probability matrix generated in the driving history data storage 310.

The driving profile generator 320 further includes a verification module configured to verify whether the driving profile satisfies statistical criteria of the driving history data. Here, the statistical criteria includes at least one of an average speed, an average acceleration, a standard deviation of speed, a standard deviation of acceleration, a mean positive acceleration, and a mean positive speed. In an example, the driving profile generator 320 receives the statistical criteria generated in the driving history data storage 310.

The battery SOC estimator 330 estimates a driving range of the electric vehicle based on the driving profile generated in the driving profile generator 320.

The battery SOC estimator 330 estimates an SOC of a vehicle battery with respect to the driving route based on the generated driving profile. In an example, the battery SOC estimator 330 estimates an SOC of a battery of the electric vehicle with respect to the driving route based on the driving profile, and estimates the driving range of the electric vehicle based on the SOC.

Figure 4:
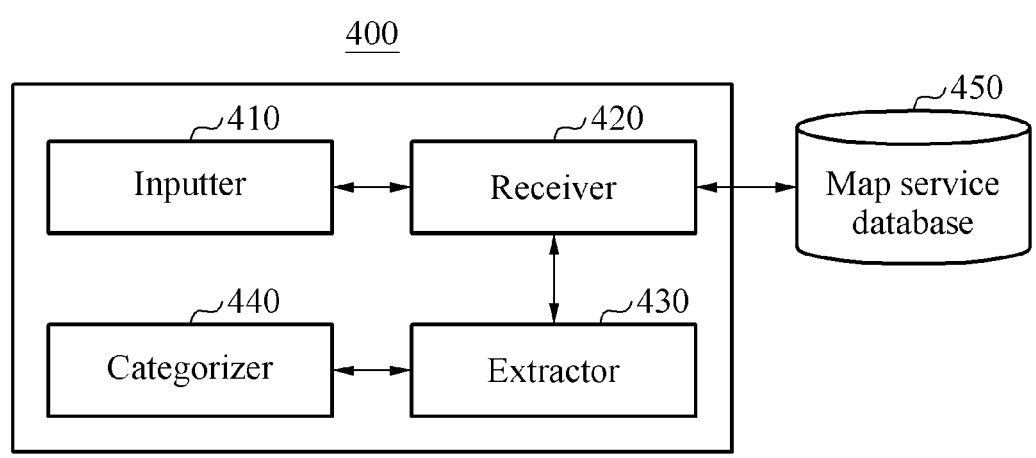
FIG. 4 is a diagram illustrating an example of a driving profile generator.

FIG. 4 is a diagram illustrating an example of a driving profile generator.

Referring to FIG. 4, a driving profile generator 400 includes an inputter 410, a receiver 420, an extractor 430, and a categorizer 440.

The inputter 410 receives an origin and a destination input by a driver. Also, the inputter 410 receives a waypoint or stopover information input by the driver.

The receiver 420 retrieves route data of driving data from a map service database 450. The map service database 450 may include at least one database among a web mapping service application (e.g., Google Maps or MapQuest) and an on-board navigation service application (e.g., TomTom or Garmin).

In an example, the receiver 420 stores the route data received from a map service application in an XML format. For example, when the receiver 420 receives route data from Google Maps, the received route data may be provided in the XML format. A file of the XML format will be described in detail with reference to FIG. 5.

The extractor 430 extracts road data corresponding to segments of the received route data. When the driver drives on a driving route, the driver may drive through many roads. Thus, the driving route received from the map service database 450 may be divided by a predetermined method to extract a plurality of items of road data.

In an example, the extractor 430 extracts the road data from a summary field of the route data of the XML format. For example, when the map service application is Google Maps, the summary field of a route field in the route data of the XML format may include the route data. Thus, the route data may be acquired by extracting data indicating a route in the summary field.

The categorizer 440 classifies the plurality of items of road data into pre-existing categories. In an example, the pre-existing categories may be generated based on appearance frequencies of road data in driving history data of the driver. Thus, the pre-existing categories may be generated based on route data of a frequently appearing route obtained by analyzing the driving history data of the driver. In an example, the categorizer 440 receives a category generated by a driving history data storage.

In this example, the categorizer 440 determines whether the road data belongs to a pre-existing defined category. When the road data belongs to a pre-existing defined category, the categorizer 440 classifies the road data as the corresponding category. When the road data does not belong to a pre-existing defined category, the categorizer 440 classifies the road data into an undefined "others" category.

In an example, the driving profile generator 400 may further include a statistical information generation module configured to generate statistical information of the driving data. The statistical information generation module may calculate a transition probability matrix of the driving data, and generate statistical criteria for the driving data of the driver.

The statistical criteria may include at least one of an average speed, an average acceleration, a standard deviation of speed, a standard deviation of acceleration, a mean positive acceleration, and a mean positive speed.

Figure 5:
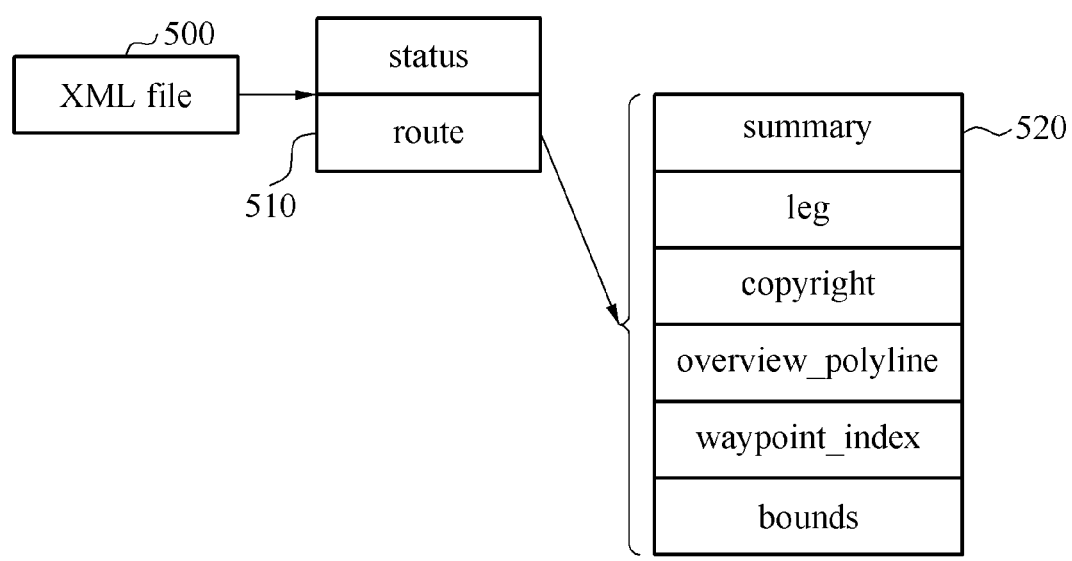
FIG. 5 is a diagram illustrating an example of route data of an extensible markup language (XML) format.

FIG. 5 is a diagram illustrating an example of route data of an XML format.

In an example, a driving profile generator 110/320/400 (FIGS. 1, 3 and 4) receives route data of an XML format, and extracts road data from a summary field of the route data.

Referring to FIG. 5, an XML file 500 includes a status field and a route field 510. A summary field 520 of the route field 510 may include road data of route data. In an example, when Google Maps is used as a map service application, the summary field 520 of the XML file 500 may include a road name.

When an origin and a destination are delivered to the map service application, a possible route from an origin to the destination may be provided. In this example, route data may be stored as data of an XML format. When the XML data is stored in variable "S", information in the summary field may be extracted using an address of "S.DirectionResponse.route.summary.Text". Thus, a category may be generated based on route information of the summary field.

For example, when a driver drives in California (CA), the summary field may be classified as "CA-XX", "US-101", "Stelling Rd", "Prospect Rd", "Central Expy", or "others" based on a frequency of road data. Thus, a first category may be a CA route, and a second category may be a US-101 route. A third category may be a name of a frequent predetermined expressway. Road data of a rare road may be classified as belonging to the "others" category.

Figure 6:
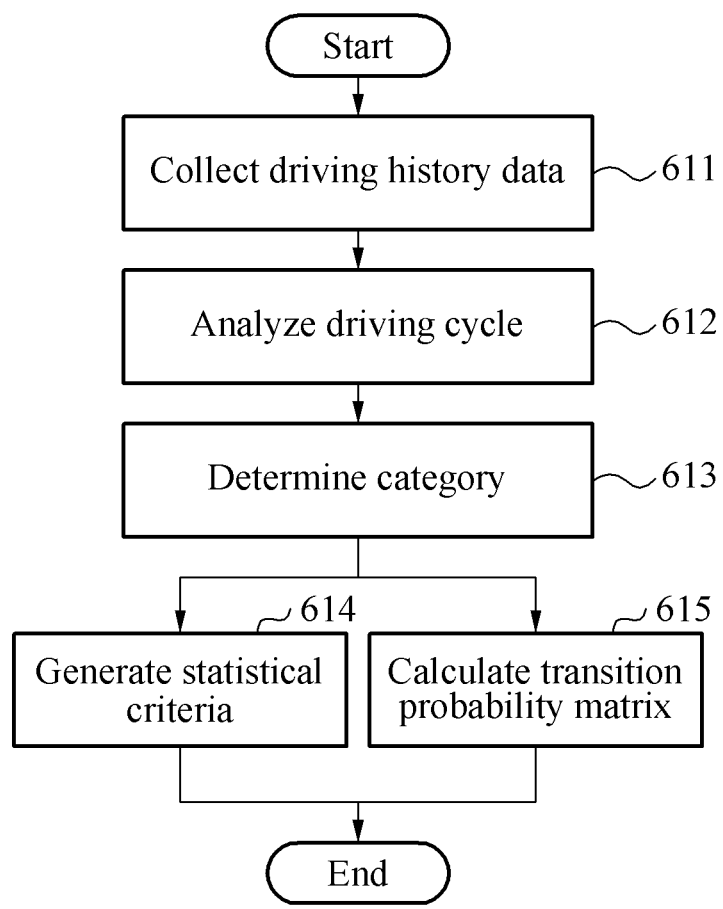
FIG. 6 is a flowchart illustrating an example of a method of analyzing driving history data of a driver.

FIG. 6 is a flowchart illustrating an example of a method of analyzing driving history data of a driver.

Referring to FIG. 6, in operation 611, the driving history data storage 310 (FIG. 3) collects driving history data. In an example, latitude and longitude coordinates generated when a driver drives may be collected using a GPS. GPS information including latitude and longitude coordinates of an electric vehicle may be stored at predetermined time intervals in a memory embedded in the electric vehicle or an external memory. Thus, a speed and an acceleration of the electric vehicle may be calculated based on the GPS information. Further, route data related to a driving history route may be collected by applying the latitude and longitude information to a map service application.

In operation 612, the driving history data storage 310 analyzes a driving cycle corresponding to the driving history data. In an example, the driving history data storage 310 extracts road data from the route data of the driving history data.

In operation 613, the driving history data storage 310 determines a category with respect to the route data of the driving cycle. The category may be a pre-existing defined category, or may be newly generated based on an appearance frequency of corresponding road data extracted from the route data.

In operation 614, the driving history data storage 310 generates statistical criteria using the category with respect to the route data of the driver. The statistical criteria includes at least one of an average speed, an average acceleration, a standard deviation of speed, a standard deviation of acceleration, a mean positive acceleration, and a mean positive speed. In an example, the statistical criteria may include a reference speed and a reference acceleration on a predetermined road.

In operation 615, the driving history data storage 310 calculates a transition probability matrix using the determined category with respect to the route data of the driver. In an example, the driving history data storage calculates the transition probability matrix using a connection of categorized road data. The transition probability matrix may be a matrix representing a relationship between a speed and an acceleration of a previous stage and a speed and an acceleration of a subsequent stage. Thus, the driving history data may be analyzed and the transition probability matrix between the previous stage and the subsequent stage on a predetermined route may be calculated based on a characteristic of the driver.

Figure 7:
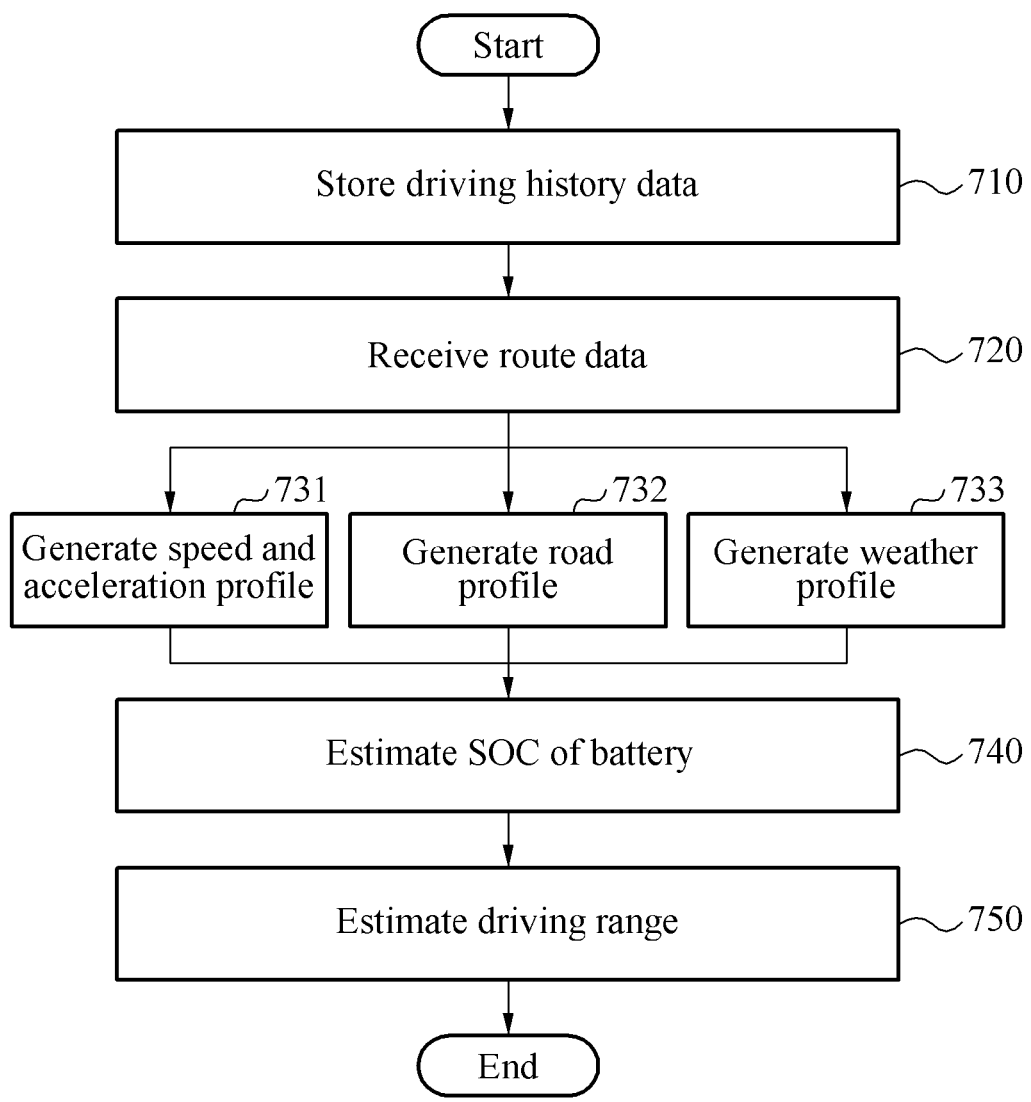
FIG. 7 is a flowchart illustrating an example of a method of estimating an SOC of a battery in an electric vehicle.

FIG. 7 is a flowchart illustrating an example of a method of estimating a driving range of an electric vehicle Referring to FIG. 7, in operation 710, a battery SOC estimator/estimation apparatus 330 (FIG. 3) stores driving history data. In this example, the battery SOC estimation apparatus 330 stores driving history data of a driver for each of categories generated based on a frequency of appearance of road data. Also, the battery SOC estimation apparatus 330 stores a speed and acceleration profile of road data corresponding to each of the generated categories.

In an example, the battery SOC estimation apparatus 330 determines whether the road data belongs to a pre-existing defined category. The battery SOC estimation apparatus 330 stores the road data by classifying the road data into a corresponding category when the road data is included in the pre-existing defined category, and stores the road data by classifying the road data into an others category when the road data is not included in the pre-existing defined category.

When an iteration count of predetermined road data in the road data classified as belonging to the others category is equal to or greater than an iteration count of road data in a category having a minimum road data iteration count among pre-existing categories, the battery SOC estimation apparatus 330 generates a new category corresponding to the predetermined road data.

In an example, the battery SOC estimation apparatus 330 generates statistical information of the driving history data, calculates a transition probability matrix of the driving history data, and generates statistical criteria of the driving history data.

In operation 720, the battery SOC estimation apparatus 330 receives route data from a map service application. In this example, a driving route may be received by sending an origin, a destination, and a waypoint to the map service application. The map service application may include at least one of a web mapping service application (e.g., Google Maps or MapQuest) and an on-board navigation service application (e.g., TomTom or Garmin).

In operations 731 through 733, the battery SOC estimation apparatus 330 categorizes the road data of the driving route for each of the generated categories, and generates a driving profile for the driving route based on the driving history data corresponding to the categorized road data. Factors affecting the driving range of the vehicle may be classified into speed and acceleration information, road slope information, and weather information. Thus, the SOC estimation apparatus 330 generates a speed and acceleration profile of the driving profile in operation 731, generates a road profile of the driving profile in operation 732, and generates a weather profile of the driving profile in operation 733.

In operation 731, speed and acceleration information based on the driving history data of the driver may be used to predict a speed and acceleration profile of the driver on a corresponding route.

In an example, the battery SOC estimation apparatus 330 extracts road data from route data. In this example, the battery SOC estimation apparatus 330 categorizes the road data for each of the categories generated based on driving history data storage. The battery SOC estimation apparatus 330 may input speed and acceleration information corresponding to the category to the categorized data, and may generate a speed and acceleration profile based on a transition probability matrix generated using the driving history data. Also, the battery SOC estimation apparatus 330 verifies whether the driving profile satisfies statistical criteria of the driving history data.

In operation 732, the map service application may be used to extract a latitude, a longitude, and an altitude of a road included in the driving route in order to generate the road profile.

In operation 733, weather information related to temperature, a direction of the wind, a wind speed, and regarding whether it rains or snows on the driving route may be extracted from a weather information website in order to generate the weather profile.

In operation 740, the battery SOC estimation apparatus 330 estimates an SOC of a battery. The SOC of the battery for a driving duration may be estimated based on the information collected in operations 731 through 733, and an amount of charge in the battery that would remain at a time of arrival at the destination may be estimated.

In operation 750, the battery SOC estimation apparatus 330 estimates the driving range of the electric vehicle based on the SOC of the battery.

Figure 8:
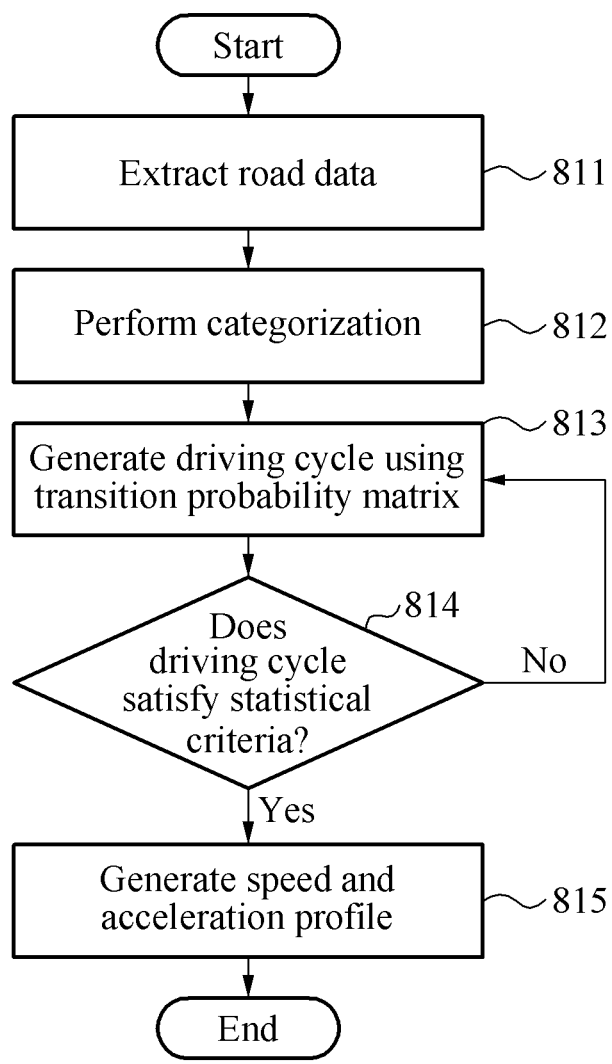
FIG. 8 is a flowchart illustrating an example of a method of generating a speed profile of a driving route.

FIG. 8 is a flowchart illustrating an example of a method of generating a speed and acceleration profile of a driving route.

Referring to FIG. 8, in operation 811, a driving profile generator 110/320/400 (FIGS. 1, 3 and 4) extracts road data from route data received through a map service application. The map service application may include at least one of a web mapping service application (e.g., Google Maps or MapQuest), and an on-board navigation service application (e.g., TomTom or Garmin). In an example, when the map service application is Google Maps, route data of the driving route may be stored as a file of an XML format. Thus, the driving profile generator extracts the road data from a summary field in the route data of the XML format.

In operation 812, the driving profile generator 110/320/400 categorizes the extracted road data. In this example, a category may be provided from operation 613 of the method of analyzing driving history data, as shown in FIG. 6. In detail, the category may be generated through an analysis of the driving history data.

In operation 813, the driving profile generator 110/320/400 generates a driving cycle using a transition probability matrix. In this example, the transition probability matrix may be a predetermined matrix, or may be generated by collecting driving history data of a corresponding driver. The transition probability matrix may be an example of a Markov chain. The Markov chain may be used to verify a relationship between a speed and an acceleration of a previous stage and a speed and an acceleration of a subsequent stage of vehicle driving route. In detail, a possibility of switching from a speed and an acceleration of a first state to a speed and an acceleration of a second state may be determined.

The transition probability matrix may be provided from operation 615 of the method of analyzing driving history data, as shown in FIG. 6. The transition probability matrix may be generated through an analysis of the driving history data. A driving history data storage 310 (FIG. 3) may use the driving history data of the driver to calculate the transition probability matrix based on the speed and the acceleration of the previous stage and the speed and the acceleration of the subsequent stage. Thus, the driving profile generator 110/320 predicts the driving cycle of the driver by applying the transition probability matrix to the categorized road data.

In operation 814, the driving profile generator 110/320/400 examines whether the generated driving cycle satisfies statistical criteria. The statistical criteria includes at least one of an average speed, an average acceleration, a standard deviation of speed, a standard deviation of acceleration, a mean positive acceleration, and a mean positive speed. When the driving cycle generated using the transition probability matrix does not satisfy the statistical criteria, another driving cycle may be generated by returning to operation 813 until the criteria are satisfied.

In an example, the statistical criteria may be provided from operation 614 of the method of analyzing driving history data, as shown in FIG. 6. The statistical criteria may be generated through an analysis of the driving history data.

In operation 815, the driving profile generator 110/320/400 generates a speed and acceleration profile of the driver based on the predicted driving cycle.

Figure 9:
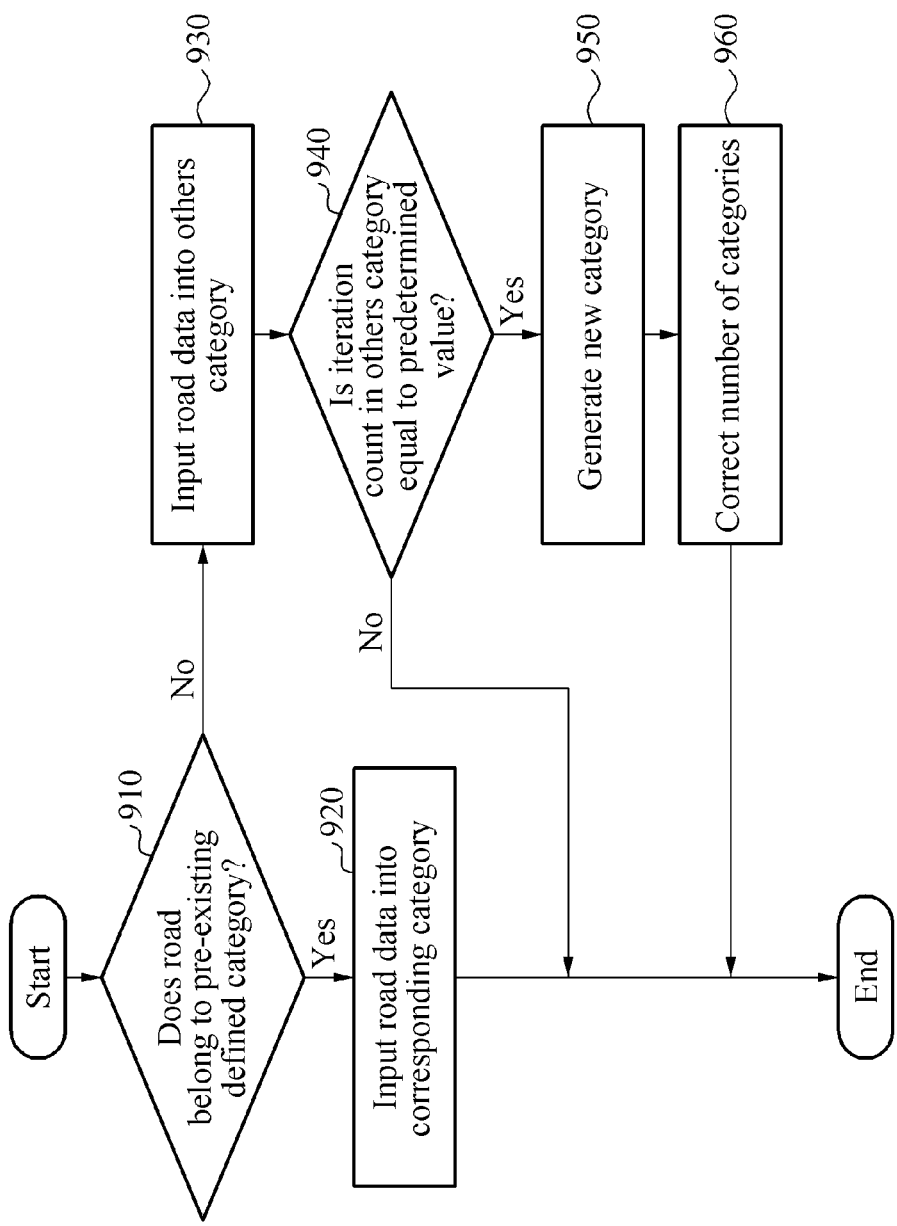
FIG. 9 is a flowchart illustrating an example of a method of generating a category based on driving history data.

FIG. 9 is a flowchart illustrating an example of a method of generating a category based on driving history data.

Referring to FIG. 9, in operation 910, a driving history data storage 310 examines whether road data belongs to a pre-existing defined category. The pre-existing defined category may be classified based on driving history data of a driver. In this example, the category may be generated based on frequent road data in the driving history data.

In operation 920, the driving history data storage 310 inputs the road data into the corresponding category in response to the road data belonging to the pre-existing defined category. As an example, when the road data includes "US-101", the road data may be input into a "US-101" category. As another example, when the road data includes "CA-85", "CA-17", and "CA-238", the road data may be input into a "CA-XX" category.

In operation 930, the driving history data storage 310 inputs the road data into an undefined "others" category in response to the road data not belonging to the pre-existing defined category. Infrequent road data in the driving history data may have a relatively low accuracy. Thus, the infrequent road data may be classified as others road data.

In operation 940, the driving history data storage 310 examines whether an iteration count in the others category is equal to a predetermined value. In an example, the predetermined value may be a road data iteration count of a category having a minimum road data iteration count, among pre-existing categories.

When the iteration count in the others category is not equal to the predetermined value, driving data classification may be terminated while the corresponding road data is being input into the others category.

In operation 950, the driving history data storage 310 generates a new defined category corresponding to the road data is generated when the iteration count in the others category is equal to the predetermined value.

In an example, when the quantity of the predetermined road data stored in the others category is equal to a quantity of predetermined road data stored in another category, the corresponding road data may be re-evaluated such that a new category is generated. The number of categories may be managed based on a relative quantity of affiliated road data. For example, when new road data is iterated the number of times corresponding to the number of road data iterations in a category having a minimum road data iteration count, among pre-existing categories, the driving history data storage may generate the new category.

In operation 960, the number of categories is corrected by adding the newly generated, defined category.

The apparatuses, units, modules, devices, and other components (e.g., the driving profile generator 110/320/400, speed profile generator 111, road profile generator 112, weather profile generator 113, power calculator 120, battery simulator 130, driving range estimator 140, driving history data storage 310, battery SOC estimator 330, map service database 340/450, inputter 410, receiver 420, extractor 430, and categorizer 440) illustrated in FIGS. 1, 3 and 4 that perform the operations described herein with respect to FIGS. 6-9 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 6-9. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6-9 that perform the operations described herein with respect to FIGS. 1, 3 and 4 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for estimating a state of charge (SOC) of a battery in an electric vehicle, the apparatus comprising:
a driving history data storage configured to store driving history data of a driver of the vehicle for each category among categories generated based on a frequency of appearance of road data; and
a processor configured to
categorize road data associated with a driving route of the vehicle for each of the generated categories,
generate a driving profile of the driver with respect to the driving route based on the driving history data corresponding to the categorized road data, and
estimate the SOC of the battery with respect to the driving route based on the driving profile.

2. The apparatus of claim 1, wherein the driving history data storage is configured to store a speed and acceleration profile of the road data corresponding to each of the generated categories.

3. The apparatus of claim 1, wherein;
the driving history data storage is configured to determine whether the road data belongs to a pre-existing defined category among the generated categories; and
the road data is classified into the pre-existing defined category in response to the road data belonging to the pre-existing defined category, and the road data is classified into an undefined category in response to the road data not belonging to the pre-existing defined category.

4. The apparatus of claim 3, wherein the driving history data storage is configured to generate a new defined category corresponding to predetermined road data in response to an iteration count of the predetermined road data classified into the undefined category being equal to a predetermined threshold value.

5. The apparatus of claim 4, wherein the predetermined threshold value is a road data iteration count of a category having a minimum road data iteration count, among pre-existing defined categories.

6. The apparatus of claim 1, wherein the driving history data storage is configured to generate statistical information of the driving history data, calculate a transition probability matrix of the driving history data, and generate statistical criteria of the driving history data.

7. The apparatus of claim 1, wherein the processor is configured to:
receive route data corresponding to the driving route from a map service database;
extract road data from the route data; and
categorize the road data for each of the generated categories.

8. The apparatus of claim 7, wherein the processor is configured to:
store the route data in an extensible markup language (XML) format; and
extract the road data from a summary field of the route data.

9. The apparatus of claim 1, wherein the processor is configured to generate the driving profile by applying the transition probability matrix to the driving history data corresponding to the categorized road data.

10. The apparatus of claim 1, wherein the processor comprises a verification module configured to verify whether the driving profile satisfies statistical criteria of the driving history data.

11. The apparatus of claim 10, wherein the statistical criteria comprises at least one of an average speed, an average acceleration, a standard deviation of speed, a standard deviation of acceleration, a mean positive acceleration, and a mean positive speed.

12. A method of estimating a state of charge (SOC) of a battery in an electric vehicle, the method comprising:
storing, in a driving history data storage, driving history data of a driver of the vehicle for each category among categories generated based on a frequency of appearance of road data;
categorizing, using a processor, road data associated with a driving route of the vehicle for each of the generated categories;
estimating, using the processor, the SOC of the battery with respect to the driving route based on the driving profile.

13. The method of claim 12, wherein the storing comprises storing a speed and acceleration profile of the road data corresponding to each of the generated categories.

14. The method of claim 12, wherein the storing comprises:
determining whether the road data belongs to a pre-existing defined category among the generated categories;
classifying the road data into the pre-existing defined category in response to the road data belonging to the pre-existing defined category; and
classifying the road data into an undefined category in response to the road data not belonging to the pre-existing defined category.

15. The method of claim 14, wherein the classifying of the road data into the undefined category comprises generating a new category corresponding to predetermined road data in response to an iteration count of the predetermined road data classified into the others category being equal to a predetermined threshold value.

16. The method of claim 12, wherein the storing comprises generating statistical information of the driving history data, calculating a transition probability matrix of the driving history data, and generating statistical criteria of the driving history data.

17. The method of claim 12, wherein the categorizing comprises generating the driving profile using at least one of a speed and acceleration profile generated based on the driving history data stored in the driving history data storage, a weather profile generated based on information received from a weather information website, and a road profile generated based on information received from a map service database.

18. The method of claim 12, wherein the categorizing comprises:
receiving route data corresponding to the driving route from a map service database;
extracting road data from the route data; and
categorizing the road data for each of the generated categories.

19. The method of claim 12, wherein the categorizing comprises generating the driving profile by applying the transition probability matrix to the driving history data corresponding to the categorized road data.

20. The method of claim 12, wherein the categorizing comprises verifying whether the driving profile satisfies statistical criteria of the driving history data.

21. An apparatus for estimating a state of charge (SOC) of a battery in an electric vehicle, the apparatus comprising:
a storage configured to store driving history data of a driver of the vehicle for each category among categories generated based on road data; and a processor configured to
- categorize road data associated with a driving route of the vehicle for each of the generated categories,
- generate a driving profile of the driver with respect to the driving route based on the driving history data corresponding to the categorized road data, wherein the driving profile comprises any one or any combination of two or more of a speed and acceleration profile, a weather profile and a road profile, and
- estimate the SOC of the battery with respect to the driving route based on the driving profile.

22. The apparatus of claim 21, wherein the generated categories are generated based on a frequency of appearance of road data.

23. A non-transitory computer-readable medium storing instructions that, when executed by a processor, cause the processor to perform the method of claim 12.

* * * * *